United States Patent

[11] 3,601,579

| [72] | Inventor | Georgy Vasilievich Gorbunov<br>bulvar Lesi Ukrainki, 2, kv. 41, Kiev,<br>U.S.S.R. |
|---|---|---|
| [21] | Appl. No. | 737,140 |
| [22] | Filed | June 14, 1968 |
| [45] | Patented | Aug. 24, 1971 |

[54] METHOD OF WELDING METAL PARTS AND ARTICLES
3 Claims, 3 Drawing Figs.

[52] U.S. Cl. .................................................. 219/137, 219/131 R
[51] Int. Cl. ....................................................... B23k 9/00
[50] Field of Search ............................................. 219/130, 131, 137

[56] References Cited
UNITED STATES PATENTS

| 3,293,403 | 12/1966 | Rudd............................. | 219/104 |
| 3,385,948 | 5/1968 | Redmond...................... | 219/137 X |
| 2,870,323 | 1/1959 | Roper et al. ................. | 219/137 |
| 3,122,629 | 2/1964 | Manz............................ | 219/137 X |

*Primary Examiner*—J. V. Truhe
*Assistant Examiner*—George A. Montanye
*Attorney*—Waters, Roditi, Schwartz & Nissen

ABSTRACT: This invention relates to a method of welding wherein molten bath is maintained between the edges of a workpiece and an electrode and subsequently moved along the edges to form a weld seam.

METHOD OF WELDING METAL PARTS AND ARTICLES

The present invention relates to methods of welding metal parts and articles.

Known in the art is a method of butt resistance welding of metal parts, where during the melting due to the effect of electric current of the edges of parts to be welded together a spattering bond of molten metal is formed between them. The welding of parts is effected by the heat, evolved by the electric current passing through these bonds, with their subsequent setting.

It is not expedient to weld sheet metal parts by the butt resistance method, especially those of small thickness, because it is practically impossible to adjust the edges to be welded so that they will coincide for obtaining a quality welded joint.

Moreover, said me hod requires powerful supply sources.

The well-known arc welding method suffers from the same disadvantage.

An object of the present invention is to eliminate said disadvantages.

The specific object of the present invention is to provide a method of welding metal parts and articles, utilizing a small amount of power to obtain high-quality welding joints, a high productivity being ensured.

Said object of the present invention is attained due to the fact that when welding articles and parts with the utilization of heat, discharged by the resistance heating in the bond of molten metal, according to the present invention, the bond of molten metal is formed between the electrode and the edges of the parts to be welded by contacting the electrode with said edges of the parts until a metal bath is formed which is is further drawn by the electrode to a value, providing an integrity of the bond formed, whereupon the electrode together with the formed molten bond is moved along the joint to be welded.

It is expedient that appropriate additives be fed into the molten bond.

Besides, a consumable electrode may be used as the electrode.

The nature of the present invention will further become more fully apparent from a consideration of the following description thereof, taken in conjunction with the accompanying drawings, in which.

For effecting the welding of metal parts the current from a power supply is fed to the electrode and to the edges to be welded. The electrode touching the edges to be welded, makes a contact therebetween.

It is known that the amount of heat evolved in the contact is proportional to the resistance value and the latter is inversely proportional to the contact pressure.

Therefore the electrode is brought into contact with the edges to be welded with minimal pressure and only to form a closed electrical circuit. At the place where the electrode contacts the edges of the parts to be welded a molten bath is formed. The electrode is moved and draws the both over a distance thus forming an elongate bond of molten metal between the edges to be welded and the electrode. When moving the electrode along the joint, the distance between the electrode and the edges to be welded is maintained in such a way that the bond of molten metal should not be destroyed.

When the optimal distance is exceeded, the electric circuit is broken and the welding is discontinued. If this distance is smaller than the optimal value, the electric circuit does not break, but the process of welding the edges stops, since the bond of molten metal disappears since the amount of heat in the contact diminishes.

The optimal distance between the electrode and the edges to be welded can be easily maintained due to the elasticity of the bond of molten metal.

Figure 1:
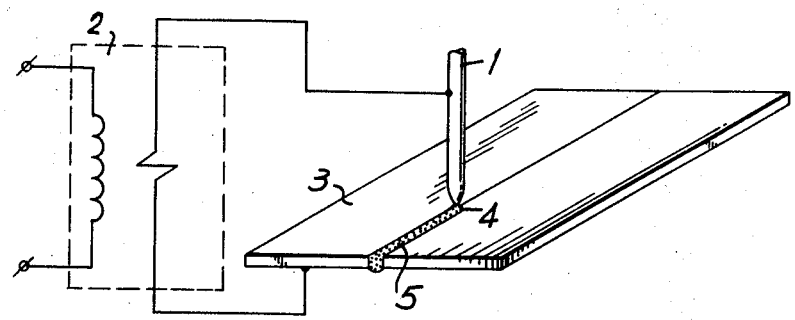
FIG. 1 is a schematic diagram featuring the welding with a nonconsumable electrode.

When welding with a nonconsumable electrode 1 (FIG. 1) the current from the power supply 2 is fed to the edges of the parts to be welded 3. The electrode 1 is made of thermoresistant electrically conductive material (columbium, molybdenum, tungsten, metalloceramics and so on). The contact between the electrode 1 and the edges to be welded of the parts 3 results in the formation of a bond 4 of molten metal and the travel of the electrode 1 along the edges to be welded results in the formation of a welded joint 5, the free formation thereof taking place during the cooling of the melted edges.

In cases when it is necessary to increase the amount of built-up metal or to change its chemical composition the nonconsumable electrode is used with metal additives.

Figure 2:
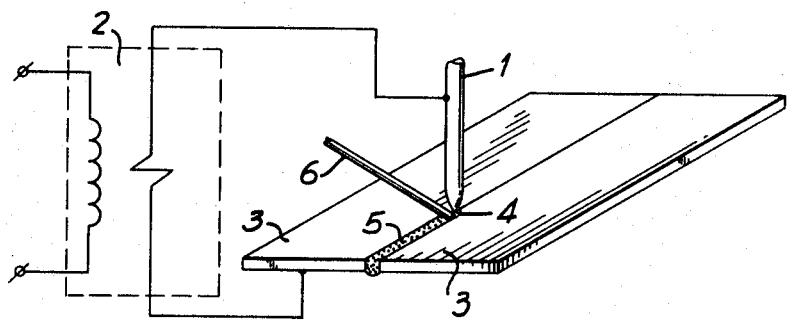
FIG. 2 is the same as FIG. 1 but with the use of metal additives.

The metal additive in the form of a wire 6 (FIG. 2) is supplied into the bond 4 of molten metal. The wire 6, melting due to the heat of the bond 4 of molten metal, favors the formation of a stronger welded joint 5.

Figure 3:
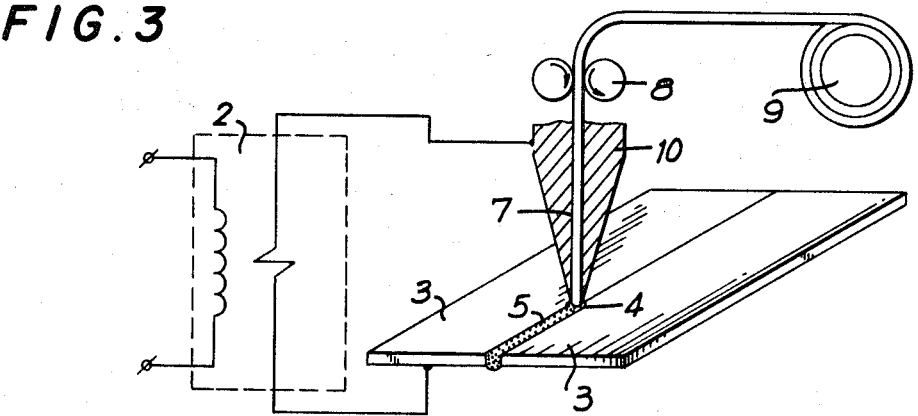
FIG. 3 is a schematic diagram of welding with a consumable electrode.

The welding of metal articles by the proposed method may be achieved also with a consumable electrode 7 (FIG. 3). In this case a metal wire is used which is continuously supplied to the place to be welded by means of rollers 8 from a coil 9 through a nozzle 10.

The electric current from the power supply 2 is fed through the nozzle 10 to the electrode 7.

The electrode 7 melts due to the heat evolved in the bond 4, which is formed between its ends and the edges to be welded of the parts 3.

As the electrode 7 moves along the edges of the parts to be welded a welded seam or joint 5 is formed.

The proposed method of welding metal articles and parts has a number of advantages over the prior art methods. For example, a high-quality welding of stainless steel sheets 0.5 mm. thick requires not more than 0.2 kv.-a., whereas for effecting the same welded joint by the previous known methods, for instance by means of resistance welding about 20 kv.-a. are required.

The proposed method of welding ensures high-quality welded joints of metals, which are poorly welded by known methods, for instance, of transformer steel.

The present invention effects added joint shearing strength and the formation hermetic welded joints. Metallographic analysis shows, that the welded joint features no pores, cracks or any inclusions, though the welding is effected without the shielding medium.

It can be explained by the fact that the process of melting the edges of metal proceeds very fast and in a small amount, and as a result the metal does not have time to oxidize.

According to the proposed method welding proceeds at a very low voltage in the secondary circuit of the power supply source; thus when the thickness of the parts of stainless steel to be welded is approximately 0.5 mm., the voltage reaches only from 0.6 to 1.2 volts.

The melting process proceeds very calmly without spattering of the molten metal.

The productivity of the process is very high, for instance, when welding steel sheets 0.2 to 0.5 mm. thick the velocity reaches 200 meters per hour.

The proposed method ensures the welding of similar and different metals, as well as metals of different thickness, the joints being of various types, viz, butt joints, overlapping and other ones in various space positions, and also in various media, including a vacuum, where the arc methods of welding include with a number of difficulties.

The proposed method may be used for building up various metals.

Moreover, the proposed method may be carried out with the use of alternating or direct current.

Through the present invention has been described herein in connection with the preferred embodiment thereof, it will be understood that various modifications and alterations may be resorted to without departing from the spirit and scope of the invention, as those skilled in the art will easily understand.

All these modifications and alterations are to be considered as falling within the spirit and scope of this invention and the appended subject matter.

What is claimed is:

1. A method of welding metal parts comprising placing two distinct metal parts having edge portions opposite one another such that the edge portion of one metal mutually adjoins the edge portion of the other metal part, placing an electrode at a point in contacting relation with each of said mutually adjoining edge portions, passing an electric current between said electrode and one of said metal parts for heating said edge portions at said point where said electrode contacts each of said edge portions, maintaining said electrode at said point until each of said edge portions melts and forms a molten bath, retracting said electrode from contact with said edge portions to draw the bath a prescribed distance therefrom such that said electrode is maintained in contact with said molten bath to preserve a bond therebetween, and moving said electrode along said mutually adjoining edge portions in spaced relation thereto to extend said bath along said edge portions and form a welded seam therealong.

2. A method as claimed in claim 1 including feeding a metal additive to said molten bath.

3. A method as claimed in claim 1 wherein said electrode is nonconsumable.